United States Patent
Herman et al.

(10) Patent No.: US 8,470,062 B2
(45) Date of Patent: Jun. 25, 2013

(54) DRAIN TUBE FOR GAS-LIQUID SEPARATION SYSTEMS

(75) Inventors: Peter K. Herman, Stoughton, WI (US); Ashwin K. Koleshwar, Stoughton, WI (US); Glenn B. Schneider, Evansville, WI (US); Arun Janakiraman, Madison, WI (US); Vinay Joshi, Pune (IN); Kwok-Lam Ng, Madison, WI (US); Srikanth Varaganti, Verona, WI (US); Bradley Smith, Columbus, IN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 219 days.

(21) Appl. No.: 13/004,696

(22) Filed: Jan. 11, 2011

(65) Prior Publication Data

US 2011/0167774 A1 Jul. 14, 2011

Related U.S. Application Data

(60) Provisional application No. 61/293,989, filed on Jan. 11, 2010.

(51) Int. Cl.
*B01D 45/00* (2006.01)
(52) U.S. Cl.
USPC ............. 55/423; 55/428; 55/433; 55/445; 55/420; 55/444; 55/446; 55/DIG. 14; 55/DIG. 55/19; 55/432
(58) Field of Classification Search
USPC ............ 55/428, 432, 433, 445, 420, 444, 55/446, DIG. 14, DIG. 19
See application file for complete search history.

(56) References Cited

U.S. PATENT DOCUMENTS

| | | | |
|---|---|---|---|
| 1,883,847 | A | 10/1932 | Van Tuyl |
| 5,469,239 | A | 11/1995 | Ishida et al. |
| 5,669,366 | A | 9/1997 | Beach et al. |
| 6,123,061 | A | 9/2000 | Baker et al. |
| 6,139,595 | A | 10/2000 | Herman et al. |
| 7,235,177 | B2 | 6/2007 | Herman et al. |
| 7,238,216 | B2 | 7/2007 | Malgorn et al. |
| 7,473,291 | B2 | 1/2009 | Evenstad et al. |
| 7,550,035 | B1 | 6/2009 | Heckel et al. |
| 7,610,793 | B2 | 11/2009 | Liu et al. |
| 7,614,390 | B2 | 11/2009 | Holzmann et al. |
| 7,648,543 | B2 | 1/2010 | Faber et al. |
| 7,655,073 | B2 | 2/2010 | Evenstad et al. |
| 7,655,140 | B2 | 2/2010 | Wieczorek et al. |
| 7,699,029 | B2 | 4/2010 | Herman et al. |
| 7,810,477 | B2 | 10/2010 | Knauf et al. |

(Continued)

OTHER PUBLICATIONS

Internet Article: "Young-Laplace Equation" (Wikipedia), Feb. 7, 2008, URL: <http://replay.waybackmachine.org/20080207002454/http://en.wikipedia.org/wiki/Young%E2%80%93Laplace_equation>, downloaded Mar. 15, 2011.

(Continued)

*Primary Examiner* — In Suk Bullock
*Assistant Examiner* — Dung H Bui
(74) *Attorney, Agent, or Firm* — Andrus, Sceales, Starke & Sawall, LLP

(57) ABSTRACT

A drain tube for an air-oil separator system, the tube being configured vertically in the system, the tube having an upper opening for receiving oil separated from air in the system, and a lower opening for releasing oil separated from air in the system, wherein the upper opening has a horizontal cross-sectional area that is greater than a horizontal cross-sectional area of the lower opening.

25 Claims, 8 Drawing Sheets

U.S. PATENT DOCUMENTS

| | | |
|---|---|---|
| 7,828,865 B2 | 11/2010 | Hodges et al. |
| 7,828,869 B1 | 11/2010 | Parikh et al. |
| 7,849,841 B2 | 12/2010 | Holzmann et al. |
| 7,857,883 B2 | 12/2010 | Scheckel et al. |
| 2006/0032486 A1 | 2/2006 | Prasad |
| 2007/0062887 A1 | 3/2007 | Schwandt et al. |
| 2007/0256566 A1 | 11/2007 | Faber et al. |
| 2008/0264018 A1 | 10/2008 | Herman |
| 2009/0100811 A1 | 4/2009 | Scheckel et al. |
| 2009/0193770 A1 | 8/2009 | Holzmann et al. |
| 2009/0211454 A1 | 8/2009 | Grafl et al. |
| 2009/0308249 A1 | 12/2009 | Anderson et al. |
| 2009/0313977 A1 | 12/2009 | Liu et al. |
| 2010/0024366 A1 | 2/2010 | Hodges et al. |
| 2010/0043734 A1 | 2/2010 | Holzmann et al. |
| 2010/0101425 A1 | 4/2010 | Herman et al. |
| 2010/0107883 A1 | 5/2010 | Faber et al. |

OTHER PUBLICATIONS

International Search Report for PCT/US2011/020854 dated Mar. 14, 2011.
Written Opinion for PCT/US2011/020854 dated Mar. 14, 2011.
International Preliminary Report on Patentability for PCT/US2011/020854 dated Jul. 26, 2012.

DRAIN TUBE FOR GAS-LIQUID SEPARATION SYSTEMS

CROSS-REFERENCE TO RELATED APPLICATIONS

The present application claims the benefit under 35 U.S.C. §119(e) to U.S. Provisional Application No. 61/293,989, filed on Jan. 11, 2010, the contents of which are incorporated herein by reference in their entireties.

BACKGROUND

The field of the invention relates to gas-liquid separation systems such as systems for separating hydrocarbon mist from exhaust. The systems typically are low-restriction type systems exhibiting a relatively low pressure gradient from upstream to downstream in the system. The systems may include systems for removing oil-mist from an air stream.

Gas-liquid separation systems including low-restriction type oil-mist separation systems are known in the art. (See, e.g., U.S. Pat. Nos. 7,828,865; 7,810,477; 7,699,029; 7,655,140; 7,655,073; 7,648,543; 7,614,390; 7,238,216; 7,235,177; 6,139,595; 5,669,366; and 5,469,239; and U.S. Published Application Nos. 20100101425; 201000024366; 20090308249; 20090193770; 20090100811; 20080264018; and 20070062887, the contents of which are incorporated herein by reference in their entireties).

SUMMARY

Disclosed herein is a drain tube for gas-liquid separation systems, in particular gas-hydrocarbon liquid separation systems (e.g., air-oil separator system). A drain tube is provided to enable separated hydrocarbon liquid in a low-restriction hydrocarbon liquid-mist separator to drain out against an adverse pressure gradient present in the separator. The tube is positioned in an area of the separator where separated hydrocarbon liquid pools and is collected. The tube has an opening at its top, a downwardly projecting tube portion, and a smaller opening at its bottom. The smaller opening functions as a flow limiter. This configuration of the tube minimizes bypass airflow into the bottom of the tube and out of the top of the tube. This configuration also produces a "self-choking" condition, whereby collected fluid forms a film across the bottom opening based on surface tension and collects in the tube to a height sufficient to overcome the adverse pressure gradient across the system and surface tension pressure at the bottom opening of the drain tube. This configuration provides a passage for collected hydrocarbon liquid in a low-restriction hydrocarbon liquid-mist separator, such as a baffle-type separator, to flow against the adverse pressure gradient that is trying to push the hydrocarbon liquid "back" up the drain hole. The presently disclosed drain tubes overcome some of the disadvantages of drainage mechanisms in the prior art including "J" tubes, check valves, oil pumps, and more complex devices.

In some embodiments, the drain tube is configured for an air-oil separator system. The drain tube may be configured substantially vertically in the system, the tube having an upper opening for receiving oil separated from air in the system on a collection-side of the system, and a lower opening for releasing oil separated from air in the system to a drainage-side of the system. The upper opening has a horizontal cross-sectional area A1 that is greater than a horizontal cross-sectional area of the lower opening A2. Pressure in the drainage-side P1 of the system is greater than pressure in the collection-side P2 of the system. The tube has a height H1 such that oil enters the tube and forms a film at the lower opening by surface tension. The oil collects in the tube to a height H2 prior to the film rupturing and the oil draining out of the lower opening the "oil-head"). P3 is surface tension pressure associated with rupturing the oil film at the lower opening.

In some embodiments, the drain tube is configured for a low-restriction air-oil separator system that exhibits a relatively low pressure gradient. For example, the difference in pressure in the drainage-side P1 and the pressure in the collection-side P2 typically is less than 5, 4, 3, or 2 in. $H_2O$ (i.e., P1−P2≦5 in. $H_2O$, preferably P1−P2≦4 in. $H_2O$, more preferably P1−P2≦3 in. $H_2O$, even more preferably P1−P2≦2 in. $H_2O$).

The disclosed drain tubes have an upper opening and a lower opening where the cross-sectional area of the upper opening A1 is substantially greater than the cross-sectional area of the lower opening A2. For example, the ratio of A1/A2 preferably is greater than 4, 9, or 16. In some embodiments, 4≦(A1/A2)≦25. The upper opening and/or the lower opening may be circular in cross-section having diameters D1 and D2, respectively. In other embodiments, the upper opening and/or the lower opening are not circular but are substantially circular in cross-section.

The height of collected fluid in the system H2 that is sufficient to overcome the adverse pressure gradient across the system and surface tension pressure at the bottom opening of the tube may be defined by the equation (P3+(P1−P2))/ρ, where P1 is pressure in the drainage side of the system, P2 is pressure in the collection-side of the system, P3 (or "bubble point" pressure) is the surface tension pressure associated with rupturing the film at the lower opening, and ρ is density of the collected liquid relative to the density of water (e.g. ρ=0.85 for oil). P3 may be defined by an equation P3=4·γ·(cos(θ)/D2)) where γ is surface tension of the collected liquid, θ is contact angle of the collected liquid on the surface of the tube, and D2 is a diameter for the bottom opening where the bottom opening is circular or substantially circular. In some embodiments, an exemplary value for γ may be within a range of 5.0×10$^{-5}$ lb$_ρ$/in.≦γ≦5.0×10$^{-4}$ lb$_ρ$/in. such as 1.14×10$^{-4}$ lb$_ρ$/in. (i.e., about 20 dyne/cm). In some embodiments, an exemplary value for θ may be within a range of 2°≦θ≦15° or approximately 5°. Preferably, the collected liquid is highly wetting on the interior surface of the tube.

The values for D1 and D2 may be chosen based on a transient multi-phase computation fluid dynamics (CFD) simulation as known in the art. (See, e.g., FIGS. 6A, B, and C). In some embodiments where P1−P2 is less than about 5, 4, 3, or 2 in. $H_2O$, an exemplary value of D1 may be within a range of 0.04 in≦D1≦0.3 in or about 3 mm (i.e., about 0.12 in), and an exemplary value for D1 may be within a range of 0.02 in.≦D2≦0.08 in. or about 1 mm (i.e. 0.04 in.).

The disclosed drain tube has an upper opening and a lower opening. The tube extends downwardly substantially vertically from the upper opening. In some embodiments, the tube may include an upper tube portion and a lower tube portion, the upper tube portion extending from the upper opening and the lower tube portion extending from the lower opening. The upper tube portion has a height defined by H1. Fluid forms a film over the lower opening and collects in the upper tube portion to a height H2 prior to the film rupturing and the fluid draining out of the lower opening, through the lower tube portion, and back into the system.

The disclosed drain tube has an upper opening and a lower opening. In some embodiments, the lower opening may be substantially aligned with the upper opening or may be substantially offset from the upper opening.

The disclosed drain tube has substantially vertical side wall(s) and a substantially horizontal bottom wall. In some embodiments, the drain tube has an upper opening and a lower opening where the lower opening is positioned in the bottom wall (i.e., where the lower opening is oriented substantially horizontally). In other embodiments, the drain tube has an upper opening and a lower opening where the lower opening is positioned at the bottom of the side wall (i.e., at the junction of the side wall and the bottom wall where the lower opening is oriented substantially vertically). The drain tube may be substantially cylindrical and have a bottom wall where the lower opening is positioned substantially vertically on the surface of the cylinder.

The disclosed drain tubes may be utilized in low-restriction air-oil separator systems that exhibit a relatively low pressure gradient. In some embodiments, the disclose drain tubes are utilized in multi-stage systems in which at least one stage exhibits a relatively low pressure gradient.

DETAILED DESCRIPTION

Figure 1:
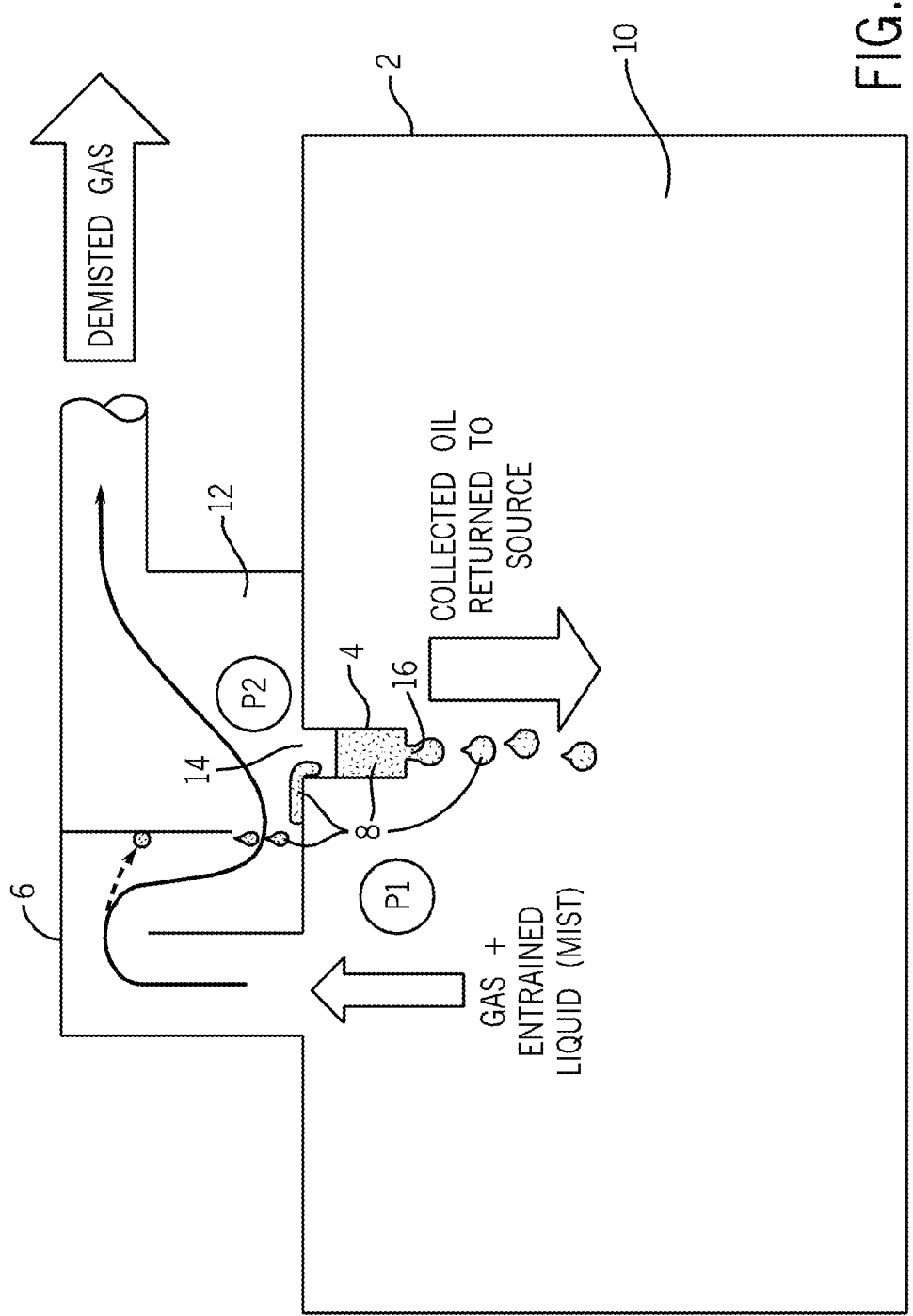
FIG. 1 is a schematic illustration of one embodiment of a drain tube as contemplated herein positioned on a baffle-type gas-liquid separator.

Disclosed herein is a drain tube for gas-liquid separation systems, which may be described using several definitions as discussed below.

Unless otherwise specified or indicated by context, the terms "a", "an", and "the" mean "one or more." In addition, singular nouns such as "system" should be interpreted to mean "one or more systems," unless otherwise specified or indicated by context.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus $\leq 10\%$ of the particular term and "substantially" and "significantly" will mean plus or minus $>10\%$ of the particular term.

As used herein, the terms "include" and "including" have the same meaning as the terms "comprise" and "comprising."

The disclosed drain tubes include a top opening and a bottom opening. The cross-sectional area of the top opening A1 is substantially greater than the cross-sectional area of the bottom opening A2. In some embodiments, A1/A2 is greater than about 4, 9, or 16. In other embodiments, $4 \leq (A1/A2) \leq 25$. The top opening and the bottom opening may be circular in cross-section having respective diameters D1 and D2. In some embodiments, D1/D2 is greater than about 2, 3, or 4. In further embodiments, $2 \leq (D1/D2) \leq 5$. Alternatively, the top opening and/or the bottom opening may not be circular in cross-section but may be substantially circular in cross-section. For example, an opening that is substantially circular in cross-section typically has a maximum cross-sectional diameter ($D_{Max}$) and a minimum cross-sectional diameter ($D_{Min}$) that do not differ in size by more than 10% (preferably that do not differ in size by more than 5%, 3%, or 1%) (i.e., $(D_{Max}-D_{Min})/D_{Min} \leq 10\%$, 5%, 3%, or 1%).

The drain tube disclosed herein may be cylindrical in shape having a cross-sectional area that is circular, or the drain tube may be substantially cylindrical having a cross-sectional area that is substantially circular. For example, a tube that is substantially cylindrical has a cross-sectional area that is substantially circular, where the cross-sectional area typically has a maximum cross-sectional diameter ($D_{Max}$) and a minimum cross-sectional diameter ($D_{Min}$) that do not differ in size by more than 10% (preferably that do not differ in size by more than 5%, 3%, or 1%) (i.e., $(D_{Max}-D_{Min})/D_{Min} \leq 10\%$, 5%, 3%, or 1%).

The drain tube disclosed herein extends downwardly from a collection-side of a gas-liquid separator system. Typically, the tube is oriented substantially vertically in the system. A tube that is oriented substantially vertically does not deviate from a vertical axis by more than 30%, and preferably does not deviate from a vertical axis by more than 20%, 10%, 5%, 3%, or 1%. The disclosed drain tube has an upper opening and a lower opening that differ substantially in cross-sectional area. The tube extends downwardly from the upper opening. In some embodiments, the tube comprises two tube portions including an upper tube portion and a lower tube portion. The upper tube portion extends from the upper opening and the lower tube portion extends from the lower opening, which is present at the bottom of the upper tube portion.

One embodiment of a drain tube 4 for a gas-liquid separation system 2 is illustrated in FIG. 1. The drain tube 4 is positioned downstream of a separation element such as a baffle, an impactor, a coalescing filter, or the like. The tube is positioned in an area where liquid (e.g., oil) removed from gas passing through the system collects for returning to the source of the liquid (e.g., a valve cover). In the system, pressure P1 in the drainage-side of the system 10 is greater than pressure P2 in the collection-side of the system 12. As such, if a "hole" is simply placed in the collection-side of the system, gas will flow upwardly through the hole and into the collection-side of the system. Any fluid collected at the site of the hole will "spit" back into the collection-side and continue to accumulate until the depth of the accumulated pool is great enough to overcome the pressure gradient P1–P2. An accumulated pool in the collection-side of the system is undesirable because the accumulated pool may be splashed back into the separation element or become re-entrained in the effluent gas exiting the system.

Figure 2:
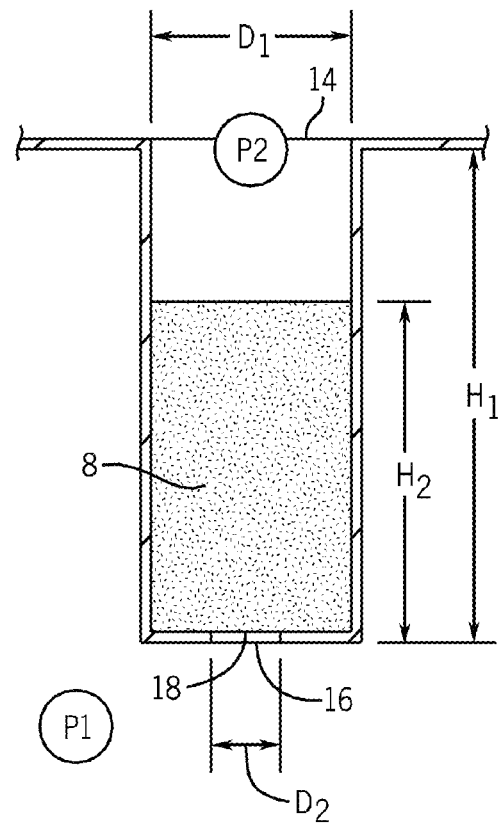
FIG. 2 illustrates one embodiment of a drain tube detail showing the parameters of tube length H1, collected liquid depth H2, collection tube diameter D1, flow-limiting orifice diameter D2, drainage-side pressure P1, and collection-side pressure P2.

The presently disclose drain tube collects fluid separated from air passing through the system. As shown in FIG. 2, in one embodiment the tube has a height H1 and an upper opening 14 having a diameter D1, such that fluid 8 enters the tube through the upper opening 14 and collects in the tube via forming a film 18 across a lower opening 16 having a smaller diameter D2. The fluid collects until and forms a column of height H2 until the column height is sufficient enough to overcome the pressure differential P1−P2 and the surface tension pressure of the film formed over the smaller opening 16. The smaller diameter D2 of the lower opening 16 limits incoming back airflow which bypasses the separation element 6. Eventually, the collected fluid creates a "hydraulic lock" in order to prevent back airflow through the tube altogether.

Figure 3:
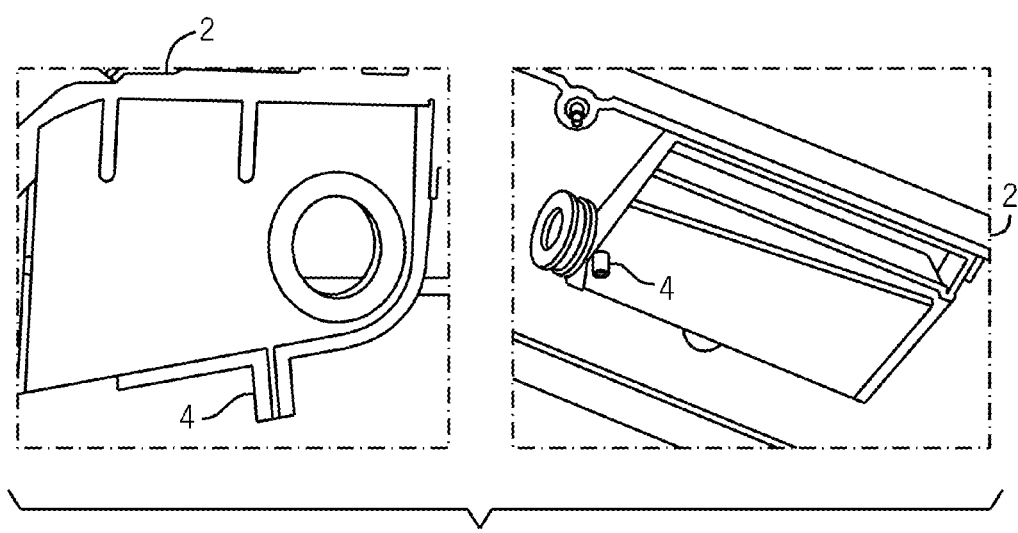
FIG. 3 illustrates one embodiment of a drain tube positioned in a gas-liquid separator system for draining collected fluid to a valve cover.

FIG. 3 illustrates one embodiment of the drain tube 4 disclosed herein where the tube is positioned on the bottom of a gas-liquid separation system 2. Separated liquid can flow via gravity out of the system and return to the original source of the liquid (e.g., to a valve cover).

Figure 4:
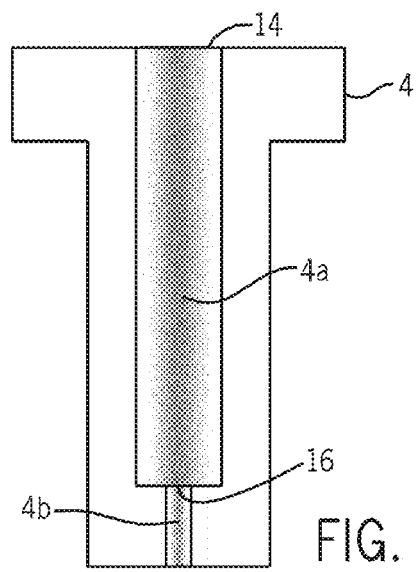
FIG. 4 illustrates one embodiment of a drain tube having an upper tube portion and a lower tube portion.

FIG. 4 illustrates one embodiment of a drain tube 4 as disclosed herein. In FIG. 4, the drain tube 4 has an upper tube portion 4a and a lower tube portion 4b. The drain tube 4 has an upper opening 14 from which the upper tube portion 4a extends. The drain tube 4 has a lower opening 16 at the bottom of the upper tube portion 42. The lower tube portion 4b extends from the lower opening 16. The lower opening 16 has a substantially smaller diameter than the upper tube portion 14.

Figure 5:
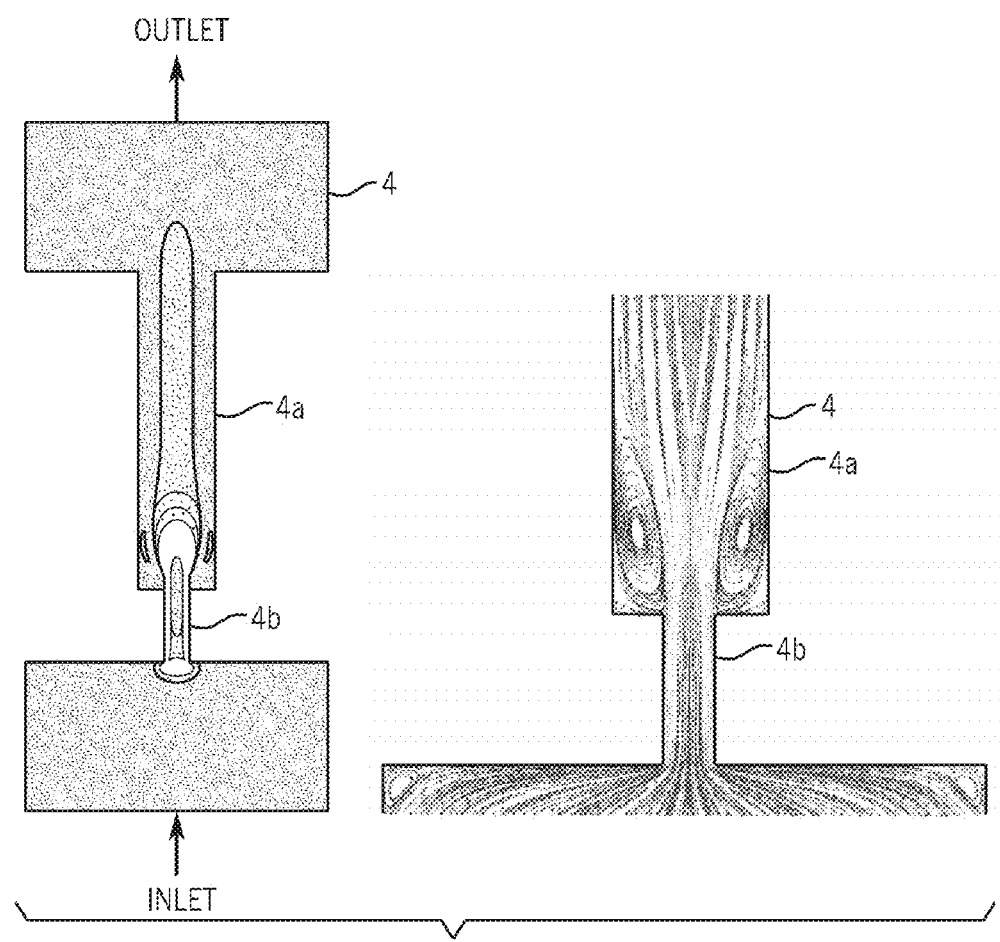
FIG. 5 illustrates one embodiment of a drain tube having an upper tube portion and a lower tube portion and a contour plot of velocity in the tube, showing high velocity in the lower tube portion but much lower velocity in the upper tube portion, enabling fluid to collect in the upper tube portion and eventually lock-off the incoming flow entirely off.

FIG. 5 illustrates one embodiment of a drain tube 4 having an upper tube portion 4a and a lower tube portion 4b and a contour plot of velocity in the drain tube 4a. The contour plot shows high velocity in the lower tube portion 4b but much lower velocity in the upper tube portion 4b. This enables fluid to collect in the upper tube portion 4a and eventually lock-off the incoming flow entirely off. Recirculation of air flow is shown in the upper tube portion 4a.

The presently disclosed drain tubes are suitable for a number of gas-liquid separation systems. The drain tubes particularly are suited for "low restriction" type separators (i.e., where P1−P2 is less than about 5, 4, 3, or 2 in. $H_2O$). In low restriction type separators, H1 of the drain tube can be reasonably short (e.g., less than about 4 or 3 in.) and still achieve hydraulic lock as described above.

In order for collected liquid to drain from the tube, the pressure associated with column H2 must be sufficient to exceed the sum of the P1−P2 gradient and the surface tension pressure associated with rupturing the liquid film formed across the lower opening P3 or "bubble point" pressure. The required pressure may be described by the equation (P1−P2)+P3. Where the collected liquid has a density that differs from water, the required pressure may be represented by the equation $(P3+(P1-P2))/\rho$, where $\rho$ is density of the collected liquid relative to density of water. For oil, $\rho$ is approximately 0.85. P3 or "bubble point" pressure may be defined by an equation $P3=4\cdot\gamma\cdot(\cos(\theta)/D2))$ where $\gamma$ is surface tension of the collected liquid on the surface of the interior of the tube and $\theta$ is contact angle of the collected liquid on the tube.

With an air-oil separator as an exemplary system, the following values can be used: D2 is ~1 mm (or ~0.04 in.), $\theta$ is 5 degrees (oil is quite wetting on most surfaces), and $\gamma$ is 20 dyne/cm (or ~$1.14 \times 10^{-4}$ $lb_p$/in). As such, P3 calculates to be ~0.3 in. $H_2O$. Assuming that P2−P1=2 in. $H_2O$, the H2 should be roughly (2+0.3)/0.85=2.7 in.

In the disclosed drain tubes, D1 may be sized such that the upflowing air in the tube does not carry collected liquid (e.g. oil) upward on the tube wall. The diameter size D1 required to achieve this condition for a low-restriction separator (e.g., where P1−P2>2 in. $H_2O$) would typically be ~2-3×(or larger) than the corresponding diameter size D2, but also depends upon the pressure drop P1−P2 which determines the flowrate created through D2. At larger pressure gradients (e.g., where P1−P2≧2 $H_2O$), the D1/D2 ratio may need to exceed 3-4. The airflow established by D2 may be calculated using standard orifice flowrate equations. D2 may be sized such that a relatively small percentage (e.g., <<10%, and preferably <2%) of the total airflow is "bypassed" through this drain port before it becomes hydraulically "locked" and flowrate goes to zero, because this airflow does not pass through the droplet separation baffles or other separation means.

Figure 6A:
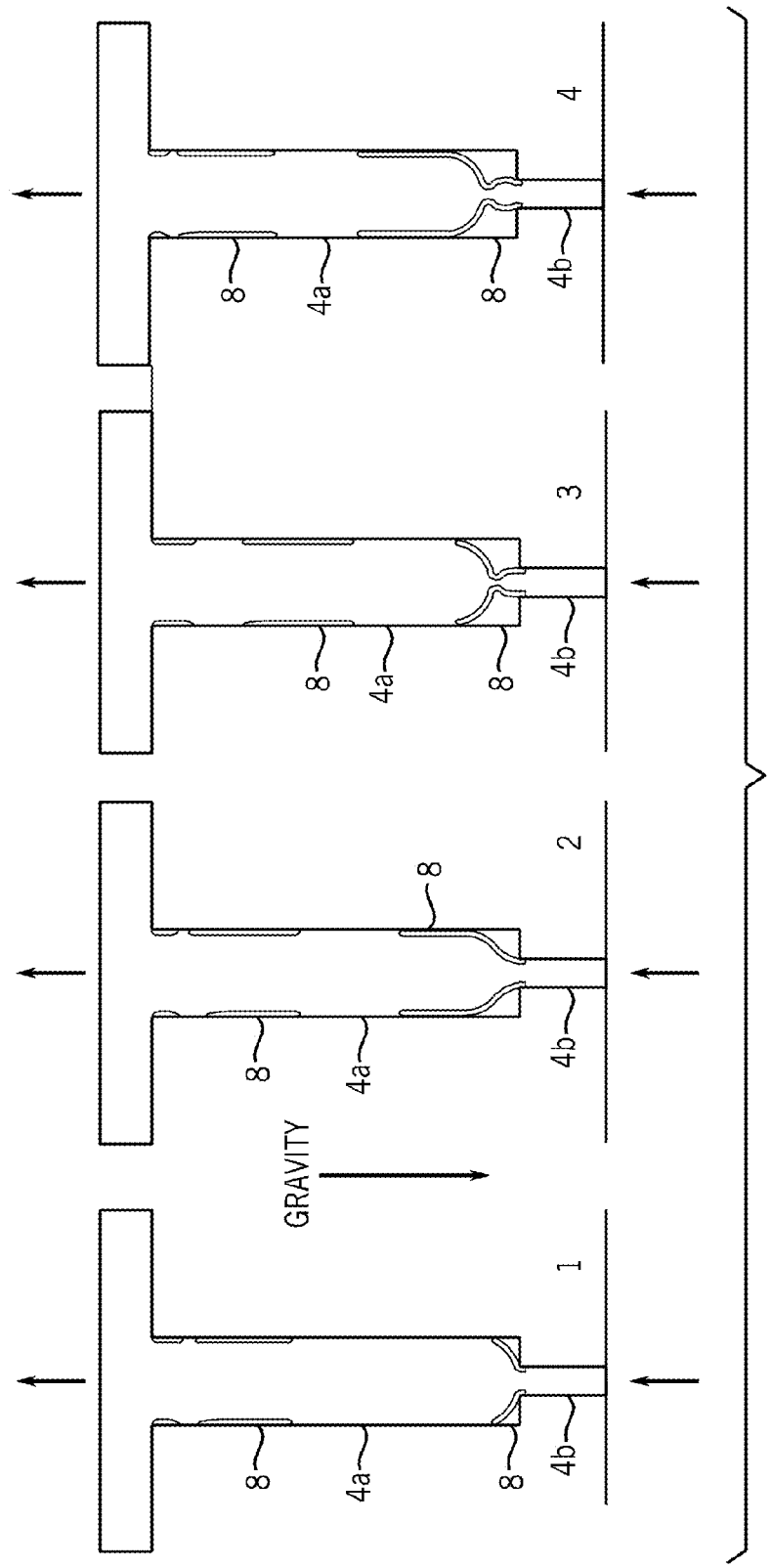
FIG. 6 illustrates one embodiment of a drain sequence from a transient two-phase CFD modeling study, showing phases as time progresses forward from 1-12 as additional liquid continues to collect in the drain tube.
Figure 6B:
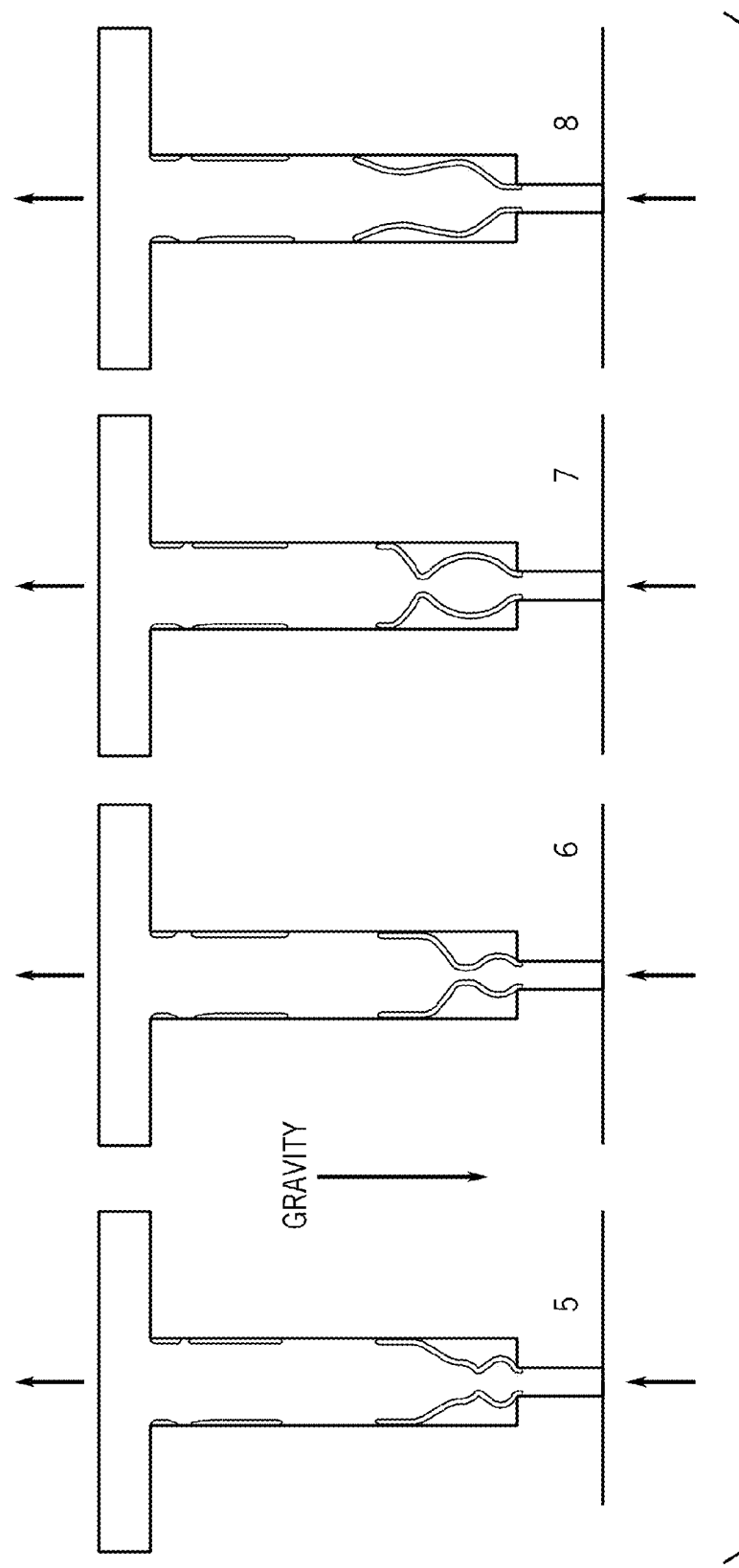
Figure 6C:
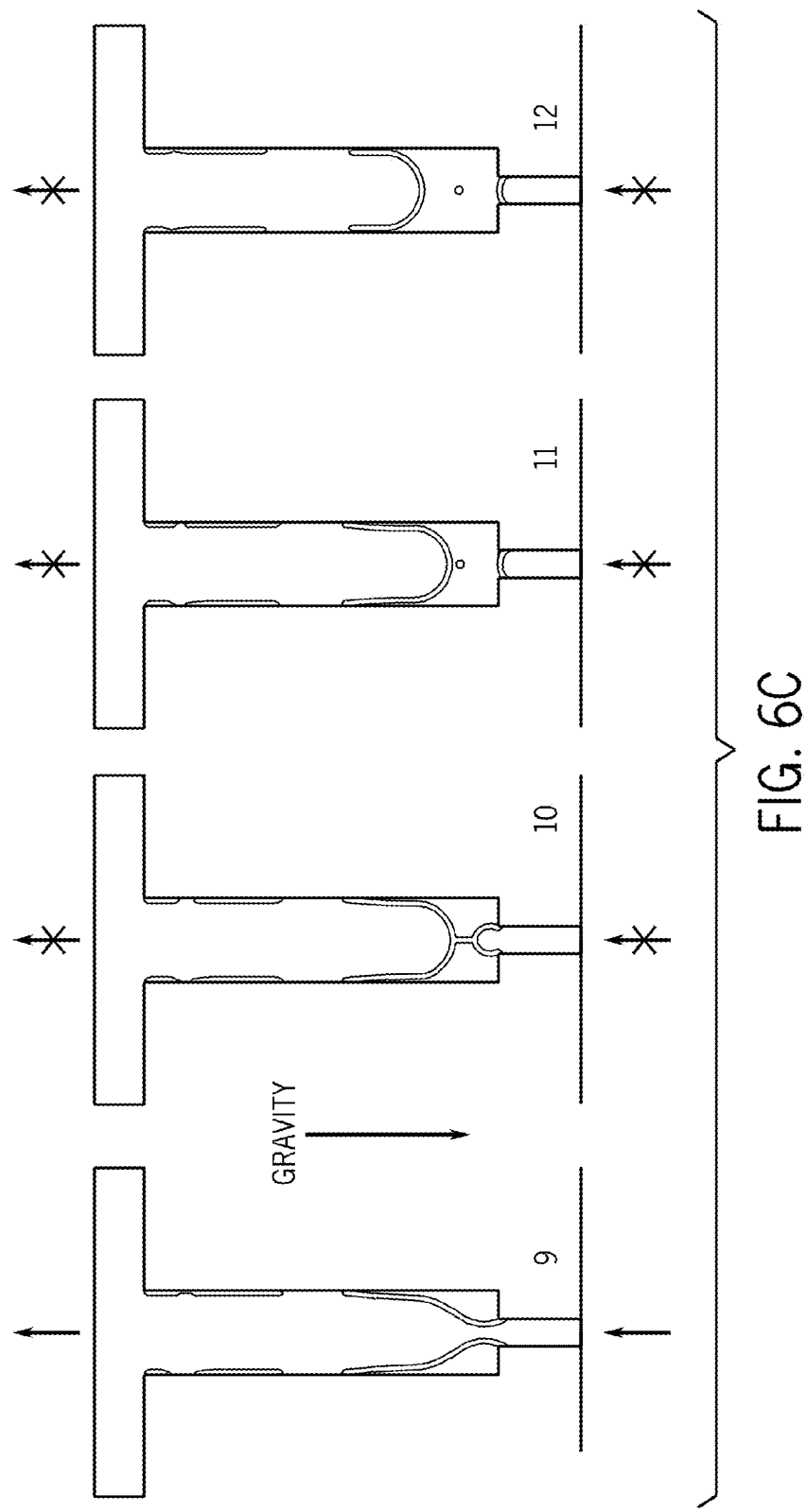

In order to test the disclosed drain tubes, a "virtual model" was built using multiphase computational fluid dynamics (CFD) modeling capability whereby oil and oil phases and their interactions can be modeled. FIG. 6 illustrates one embodiment of a drain sequence from this modeling study, showing phases as time progresses forward from 1-12 as oil 8 collects in the drain tube. As shown in FIG. 6A and B, nos. 1-8, oil 8 collects in the upper portion 4a of the drain tube but is prevented from flowing out of the tube via air flowing upwards through the tube. As shown in FIG. 6C, nos. 9-12, eventually oil 8 collects in upper portion 4a and forms a film 18 at the lower opening 16. The oil 8 will continue to collect to a sufficient height whereby the pressure differential and the surface tension pressure of the film are overcome and the oil 8 flows through the lower tube portion 4b and from the tube (not shown). Therefore, the CFD model showed an initial oil filling process (i.e., falling oil film with upward core of air flow), followed by hydraulic lock, and ultimately drainage through the tube as shown in series of figures illustrating drain sequence below. Note that in this particular case, the expected P1−P2 gradient was modeled to be <0.2 in. $H_2O$, so a shorter H1 of 13 mm was employed.

Figure 7:
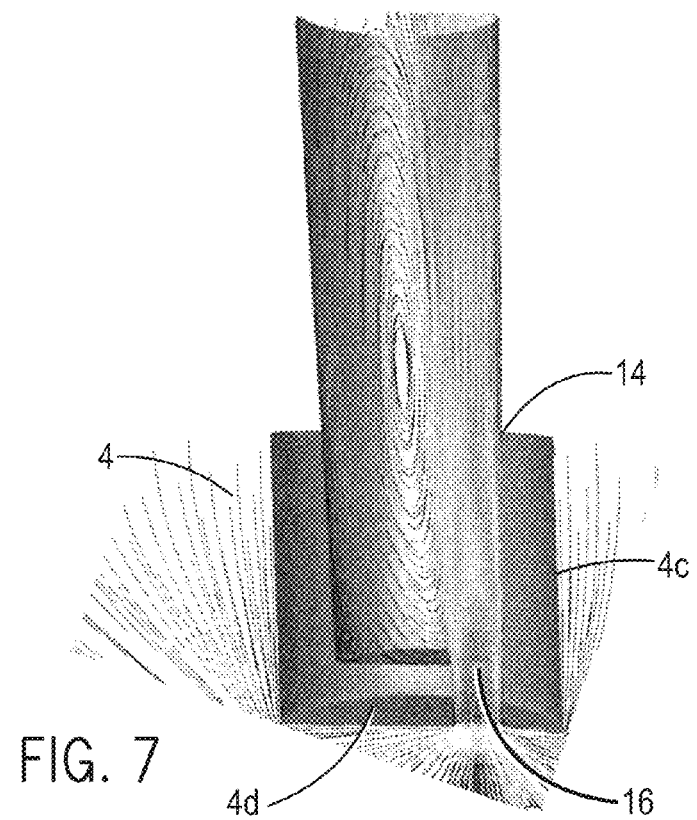
FIG. 7 illustrates one embodiment of a drain tube as contemplated herein having a lower opening in a bottom wall.

In the disclosed drain tubes, the lower opening may be substantially aligned with the upper opening or may be substantially offset from the upper opening. For example, the lower opening may be substantially aligned with the upper opening where an axis through the centers of the upper opening and the lower opening is substantially vertical. In contrast, as shown in FIG. 7, the disclosed drain tube has an upper opening 14 and an offset lower opening 16. The drain tube disclosed in FIG. 7 has substantially vertical side wall(s) 4c (in FIG. 7 the disclosed drain tube is substantially cylindrical) and a substantially horizontal bottom wall 4d. In FIG. 7, the lower opening is positioned in the bottom wall 4d (i.e., where the lower opening is oriented substantially horizontally) and adjacent to the side wall 4c of the tube.

Figure 8:
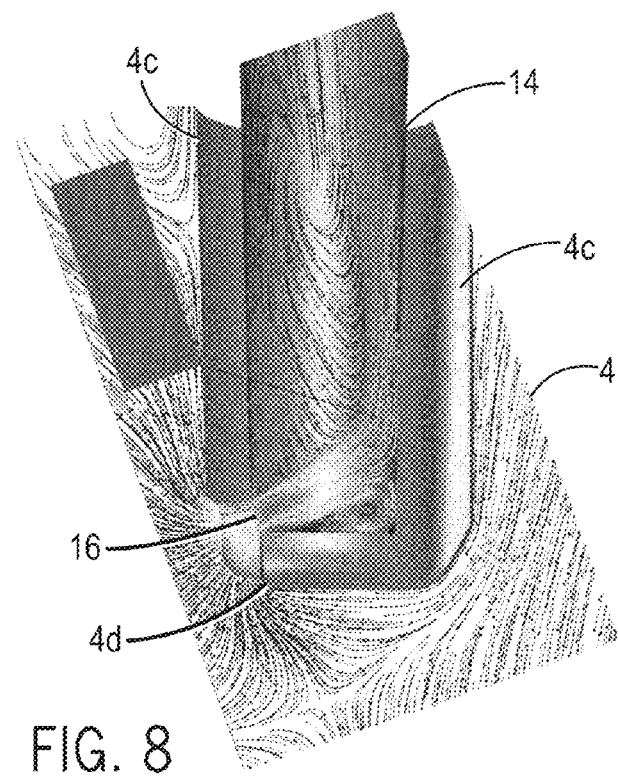
FIG. 8 illustrates one embodiment of a drain tube as contemplated herein having a lower opening at least partially in a side wall at the junction of the side wall and a bottom wall.

Referring now to FIG. 8, the drain tube has an upper opening 14 and a lower opening 16 where the lower opening is at the bottom of the side wall 4c (i.e., at the junction of the side wall 4c and the bottom wall 4d where the lower opening 16 is oriented substantially vertically). The positioning and orientation of the lower opening in FIG. 8 directs the incoming jet flow to hit the side wall and diffuse more fully before reaching the top of the drain tube than an opening positioned at the bottom wall and oriented substantially horizontally (i.e. coaxially with the tube). In FIG. 7, continuous oil drain may be hampered because of incomplete diffusion of the jet flow, in which resultant higher velocity may carry droplets of oil out of the collection tube and prevent the tube from filling and locking (see FIG. 7).

The disclosed drain tubes may be utilized in gas-liquid separation systems including low-restriction type oil-mist separation systems. (See, e.g., U.S. Pat. Nos. 7,828,865; 7,810,477; 7,699,029; 7,655,140; 7,655,073; 7,648,543; 7,614,390; 7,238,216; 7,235,177; 6,139,595; 5,669,366; and 5,469,239; and U.S. Published Application Nos. 20100101425; 201000024366; 20090308249; 20090193770; 20090100811; 20080264018; and 20070062887, the contents of which are incorporated herein by reference in their entireties). In some embodiments, the disclosed drain tubes are utilized in single-stage or multi-stage systems in which at least one stage exhibits a relatively low pressure gradient. Suitable stages may include convention or variable impactors. (See, e.g., U.S. Pat. Nos. 7,857,883; 7,849,841; 7,828,869; 7,828,865; 7,810,477; 7,776,139; 7,699,029; 7,655,073; 7,648,543; 7,614,390; 7,610,793; 7,550,035; 7,473,291; 7,238,216; and 6,123,061; and U.S. Publication Nos. 20100107883; 20100101425; 20100043734; 20100024366, 20090313977; 20090308249; and 20090193770, the contents of which are incorporated herein by reference in their entireties).

Figure 9:
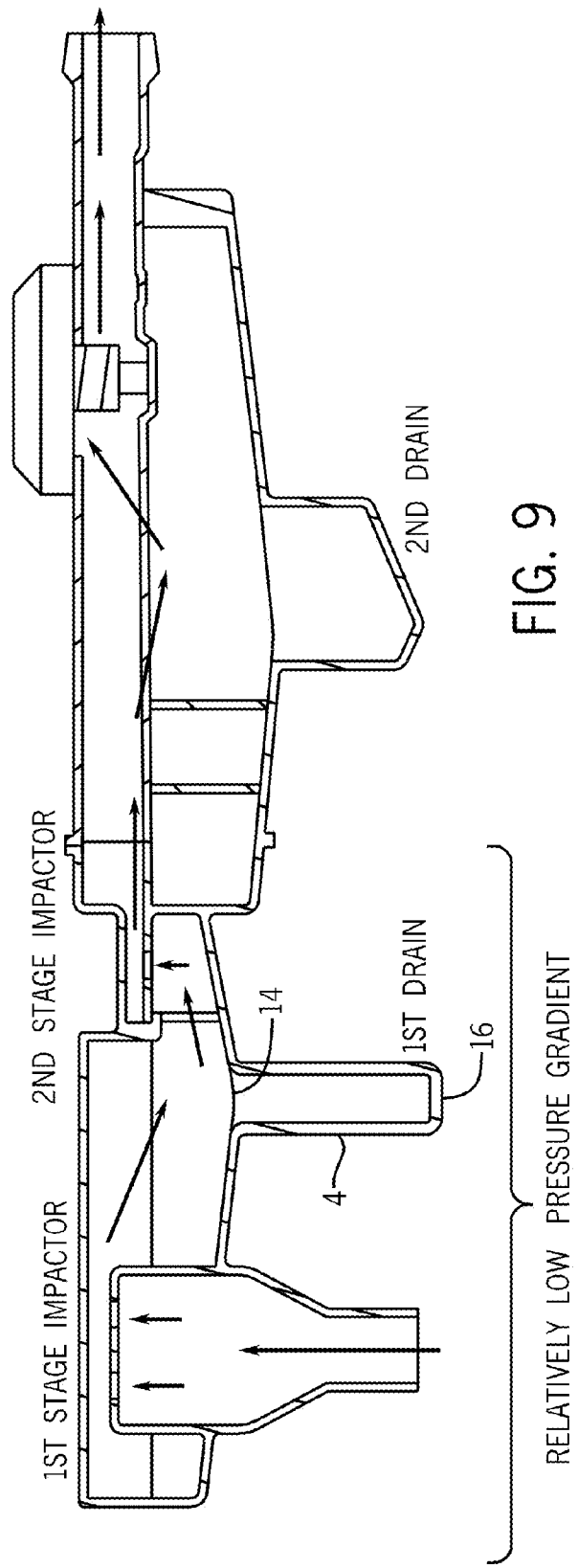
FIG. 9 illustrates one embodiment of a drain tube as contemplated herein utilized in a 2-stage impactor system.

Shown in FIG. 9 is an application of the disclosed drain tube in a 2-stage impactor. In FIG. 9, the $1^{st}$ stage impactor has larger nozzles than the $2^{nd}$ stage impactor. The $1^{st}$ stage impactor eliminates liquid oil from the blow-by stream and the $2^{nd}$ stage impactor removes finer particles. The larger nozzles in the 1st stage impactor require less oil-head to achieve continuous flow from the $1^{st}$ drain due to a smaller differential pressure, which the oil head needs to overcome. The blow-by gas from the engine goes through the $1^{st}$ stage impactor. Most liquid particles are expected to be separated by this stage. The separated liquid oil then accumulate in the drain column and start draining until sufficient oil head is reached to overcome the back-pressure caused by the $1^{st}$ stage impactor. The filtered gas continues to the $2^{nd}$ stage impactor for finer filtration. Because the $2^{nd}$ stage impactor has smaller nozzles than the $1^{st}$ stage impactor, the differential pressure in the $2^{nd}$ stage impactor is higher than that of the $1^{st}$ stage impactor. As such, the $2^{nd}$ stage impactor requires more oil-head to achieve continuous flow the $2^{nd}$ drain because the oil-head has to overcome the total pressure drop across the $1^{st}$ and $2^{nd}$ stage impactors. The separated oil is expected to accumulate in the void volume inside the housing when the oil-head is not enough to overcome the total pressure. However, the separated oil will return to the sump as the engine comes down on load or shuts down, whenever the oil-head exceeds the total differential pressure.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

What is claimed is:

1. A drain tube for an air-oil separator system, the tube being configured substantially vertically in the system, the tube having an upper opening for receiving oil separated from air in the system on a collection-side of the system, and a lower opening for releasing oil separated from air in the system to a drainage-side of the system, wherein the upper opening has a horizontal cross-sectional area A1 that is greater than a horizontal cross-sectional area of the lower opening A2, pressure in the drainage-side P1 is greater than pressure in the collection-side P2, the tube has a height H1, the oil forms a film at the lower opening by surface tension and collects in the tube to a height H2 prior to the film rupturing and the oil draining out of the lower opening, and P3 is surface tension pressure associated with rupturing the oil film at the lower opening.

2. The drain tube of claim 1, wherein $4 \leq (A1/A2) \leq 25$.

3. The drain tube of claim 2, wherein the upper opening is circular in cross-section and has a diameter D1 and the lower opening is circular in cross-section and has a diameter D2.

4. The drain tube of claim 1, wherein the tube comprises an upper tube portion and a lower tube portion, the upper tube portion extending from the upper opening and the lower tube portion extending from the lower opening, and the upper tube portion having a height defined by H1 and the oil collects in the upper tube portion to a height H2 prior to the film rupturing and the oil draining out of the lower opening and through the lower tube portion.

5. The drain tube of claim 1, wherein the upper opening and lower opening are substantially aligned.

6. The drain tube of claim 1, wherein the upper opening and lower opening are substantially offset.

7. The drain tube of claim 1, wherein the lower opening is oriented substantially horizontally.

8. The drain tube of claim 1, wherein the lower opening is oriented substantially vertically.

9. A multi-stage impactor comprising the drain tube of claim 1.

10. A drain tube for an air-oil separator system, the tube being configured substantially vertically in the system, the tube having an upper opening for receiving oil separated from air in the system on a collection-side of the system, and a lower opening for releasing oil separated from air in the system to a drainage-side of the system, wherein the upper opening has a horizontal cross-sectional area A1 that is greater than a horizontal cross-sectional area of the lower opening A2, the tube is cylindrical in shape and the upper opening has a diameter D1 that is greater than the diameter of the lower opening D2, pressure in the drainage-side P1 is greater than pressure in the collection-side P2, the tube has a height H1, the oil forms a film at the lower opening by surface tension and collects in the tube to a height H2 prior to the film rupturing and the oil draining out of the lower opening, and P3 is surface tension pressure associated with rupturing the oil film at the lower opening.

11. The drain tube of claim 10, wherein $2 \leq (D1/D2) \leq 5$.

12. The drain tube of claim 10, wherein the tube comprises an upper tube portion and a lower tube portion, the upper tube portion extending from the upper opening and the lower tube portion extending from the lower opening, and the upper tube portion having a height defined by H1 and the oil collects in the upper tube portion to a height H2 prior to the film rupturing and the oil draining out of the lower opening and through the lower tube portion.

13. The drain tube of claim 10, wherein the upper opening and lower opening are substantially aligned.

14. The drain tube of claim 10, wherein the upper opening and lower opening are substantially offset.

15. The drain tube of claim 10, wherein the lower opening is oriented substantially horizontally.

16. The drain tube of claim 10, wherein the lower opening is oriented substantially vertically.

17. A multi-stage impactor comprising the drain tube of claim 10.

18. A drain tube for an air-oil separator system, the tube being configured substantially vertically in the system, the tube having an upper opening for receiving oil separated from air in the system on a collection-side of the system, and a lower opening for releasing oil separated from air in the system to a drainage-side of the system, wherein the upper opening has a horizontal cross-sectional area A1 that is greater than a horizontal cross-sectional area of the lower opening A2, pressure in the drainage-side P1 is greater than pressure in the collection-side P2, the tube has a height H1, the separated oil forms a film at the lower opening by surface tension and is not released from the tube until oil collects in the tube and reaches a sufficient height H2 to overcome sum of surface tension at the lower opening P3 and differential air pressure across the drain port (P1−P2).

19. The drain tube of claim 18, wherein the upper opening is circular in cross-section and has a diameter D1 and the lower opening is circular in cross-section and has a diameter D2, and $2 \leq (D1/D2) \leq 5$.

20. The drain tube of claim 18, wherein the tube comprises an upper tube portion and a lower tube portion, the upper tube portion extending from the upper opening and the lower tube portion extending from the lower opening, and the upper tube portion having a height defined by H1 and the oil collects in the upper tube portion to a height H2 prior to the film rupturing and the oil draining out of the lower opening and through the lower tube portion.

21. The drain tube of claim 18, wherein the upper opening and lower opening are substantially aligned.

22. The drain tube of claim 18, wherein the upper opening and lower opening are substantially offset.

23. The drain tube of claim 18, wherein the lower opening is oriented substantially horizontally.

24. The drain tube of claim 18, wherein the lower opening is oriented substantially vertically.

25. A multi-stage impactor comprising the drain tube of claim 18.

* * * * *